(No Model.)
J. E. ANGER & D. PORTER.
CAR COUPLING.
No. 293,132. Patented Feb. 5, 1884.
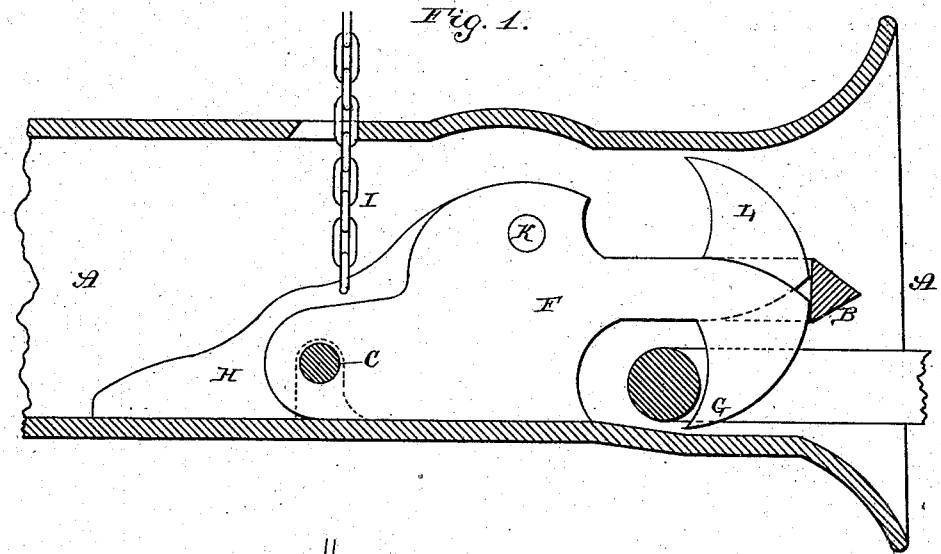
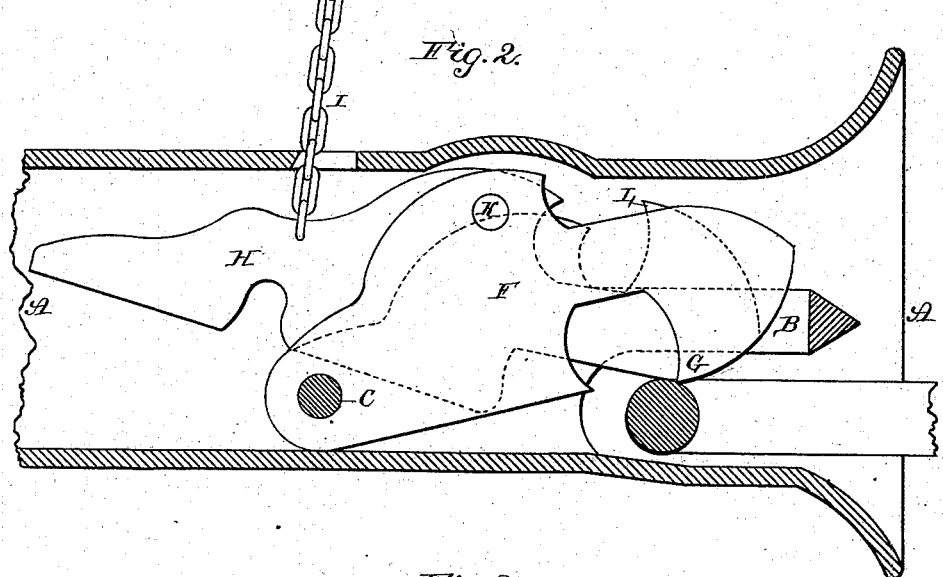
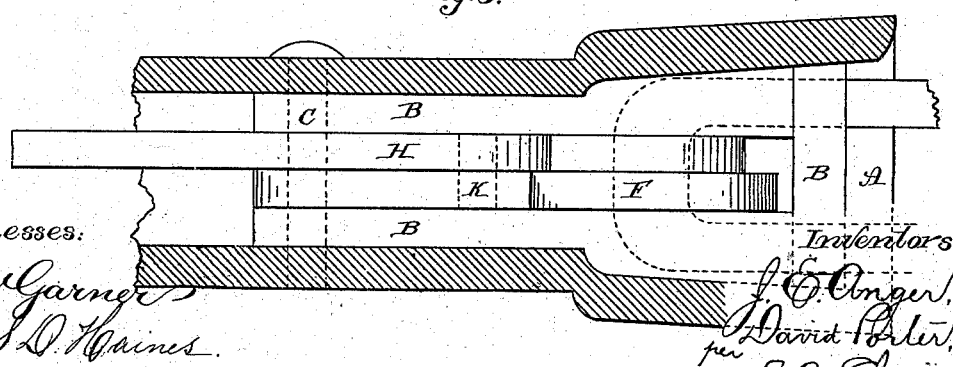

UNITED STATES PATENT OFFICE.

JOHN E. ANGER AND DAVID PORTER, OF SCHENECTADY, NEW YORK.

CAR-COUPLING.

SPECIFICATION forming part of Letters Patent No. 293,132, dated February 5, 1884.

Application filed August 20, 1883. (No model.)

*To all whom it may concern:*

Be it known that we, JOHN E. ANGER and DAVID PORTER, of Schenectady, in the county of Schenectady and State of New York, have invented certain new and useful Improvements in Car-Couplings; and we do hereby declare the following to be a full, clear, and exact description of the invention, such as will enable others skilled in the art to which it pertains to make and use it, reference being had to the accompanying drawings, which form part of this specification.

Our invention relates to an improvement in Car-Couplers; and it consists in the combination of a link-guide, which is pivoted inside of the draw-head, and two hooks which are connected together by a pin, and which move in opposite directions, as will be more fully described hereinafter.

The object of our invention is to place the link-guide in the center of the mouth, and to have two automatically-operating hooks, which operate in opposite directions, in the rear of the guide, so that when the link enters the draw-head, whether above or below the guide, a coupling at once takes place.

Figure 1 is a side elevation of our invention, partly in section, showing the hooks in one position. Fig. 2 is a similar view, showing the hooks in another position. Fig. 3 is a horizontal section of our coupling.

A represents the draw-head, which may be of any desired shape, size, or construction, so that it has a flaring mouth. Placed inside of this draw-head is the link-guide B, which is made in a single piece, and of a rectangular shape, and which is pivoted at its rear end and near its lower edge upon the pin C, which also passes through the bottom hook, F. This pin serves as a pivot upon which the link-guide and the bottom hook turn. This link-guide projects forward to the mouth of the draw-head, and, being made triangular in cross-section, serves to deflect the link either up or down as it is entering the draw-head. Whether the link rises and passes in upon the top of the link-guide or passes underneath is immaterial; in either case the coupling will take place. The bottom hook, F, turns upon its pivotal pin and extends forward so that its front end comes just beyond the link-guide, and its hook G, behind which the link catches, projects down to or near the bottom of the draw-head. When the link enters the draw-head below the link-guide, it raises this front hooked end of the bottom hook upward, and then the hook drops down over the link, and the coupling takes place. Placed inside of the link-guide is a second or top hook, H, which extends as far forward as the bottom hook, and which extends backward a considerable distance farther, as shown, and to the rear end of which is secured the chain, cord, or wire I, by means of which the parts are uncoupled or set so that they will not couple at all. Projecting from the inner side of this top hook, H, is a pin, stud, or projection, K, which passes through the bottom hook at or near its top edge. This hook serves to pivot the two hooks together, so that when one moves the other will move also. This pin, stud, or projection K also serves as the pivot upon which the top hook moves. The front end of this top hook projects forward just to the rear of the link-guide, and extends upward near the top of the inside of the draw-head. When the coupling-link enters the mouth of the draw-head, it forces its hooked end L downward, the top hook turning upon the pin K as a pivot. When it is desired to uncouple the cars, an outward pull is exerted upon the chain, cord, or wire, which raises the rear end of the top hook upward, as shown in Fig. 2. The top hook first turns upon its pivot K without affecting the bottom hook, until the front hooked end bears against the bottom of the draw-head, when the continued upward movement causes the front end of the bottom hook to rise upward, as shown in Fig. 2, so as to release the coupling. As soon as the rear end of the top hook is released, it sinks back into place and draws the bottom hook back into position at the same time. Both hooks are then ready to couple, as above described. In case it is desired that no coupling should take place, it is only necessary to keep the rear end of the top hook suspended at such a point that the two hooked ends will catch behind the link-guide, and thus prevent any coupling from taking place.

All that is necessary to apply our invention to any of the draw-heads now in use is to drill holes for the pin which passes through the link-guide and the bottom hook, insert the link-guide and the two hooks in position, and then force the pin into place. If so desired, the link-guide can be extended backward any suitable distance and slotted, or otherwise constructed, so that it can be drawn out and serve as a link to couple with another draw-head of any kind. The link-guide can then be used, independently of the hook, with a common pin-coupling. It can also be used for guiding the link without using the hands, by having its front end extend below the mouth of the draw-head, and then by regulating the angle at which the link-guide extends outward, by a lever or other means, the entering link will be guided directly into the draw-head.

Having thus described our invention, we claim—

1. In a car-coupling, the combination of two hooks which move in opposite directions, and which are pivoted together in such a manner that the raising of the rear end of one hook will move the front ends of the hooks in opposite directions, substantially as shown.

2. In a car-coupling, the combination of the draw-head, the link-guide, and the two coupling-hooks, which are pivoted together and connected to the link-guide in the manner and for the purpose set forth.

In testimony whereof we affix our signatures in presence of two witnesses.

JOHN E. ANGER.
DAVID PORTER.

Witnesses:
EVERETT SMITH,
C. B. ANGLE.